(12) United States Patent
Lee et al.

(10) Patent No.: US 12,221,308 B2
(45) Date of Patent: Feb. 11, 2025

(54) ELECTRODE SHEET REWINDING APPARATUS INCLUDING POSITION-CHANGEABLE IDLE ROLLER

(71) Applicant: LG Energy Solution, Ltd., Seoul (KR)

(72) Inventors: Seung Hoo Lee, Daejeon (KR); Jin Soo Lee, Daejeon (KR); Young Soo Lee, Daejeon (KR); Hong Ju Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 321 days.

(21) Appl. No.: 17/913,931

(22) PCT Filed: Jul. 8, 2021

(86) PCT No.: PCT/KR2021/008703
§ 371 (c)(1),
(2) Date: Sep. 23, 2022

(87) PCT Pub. No.: WO2022/065642
PCT Pub. Date: Mar. 31, 2022

(65) Prior Publication Data
US 2023/0119768 A1    Apr. 20, 2023

(30) Foreign Application Priority Data

Sep. 28, 2020    (KR) .................. 10-2020-0125808

(51) Int. Cl.
*B65H 18/00*    (2006.01)
*B65H 18/14*    (2006.01)
*B65H 23/18*    (2006.01)

(52) U.S. Cl.
CPC ............. *B65H 18/14* (2013.01); *B65H 23/18* (2013.01); *B65H 2701/19* (2013.01)

(58) Field of Classification Search
CPC ...... B65H 18/14; B65H 23/18; B65H 23/195; B65H 23/048; B65H 2701/19;
(Continued)

(56) References Cited

U.S. PATENT DOCUMENTS 3,989,201 A * 11/1976 Cottrell .................. B65H 23/18
                                                         242/420.2
2015/0321862 A1    11/2015 Song
2020/0373608 A1    11/2020 Kim et al.

FOREIGN PATENT DOCUMENTS

CA          2198608 A1 *  1/1997 ............. B65H 18/00
CN          108750756 A  * 11/2018
(Continued)

OTHER PUBLICATIONS

International Search Report for PCT/KR2021/008703 mailed Oct. 15, 2021. 3 pgs.
(Continued)

*Primary Examiner* — Emmanuel M Marcelo
(74) *Attorney, Agent, or Firm* — Lerner David LLP

(57) ABSTRACT

An electrode sheet rewinding apparatus for rewinding an electrode sheet includes a bobbin having a PET film wound therearound, a bobbin holder configured to hold the bobbin, a base plate located under the bobbin holder and configured to support the bobbin holder, a roller type touch roll configured to press an electrode sheet rewound around the bobbin above the bobbin to prevent meandering of the electrode sheet, a vertical plate located at one side of the base plate, the touch roll attached to the vertical plate, and an idle roller unit configured to form a tangential line to the electrode sheet rewound around the bobbin together with the touch roll. The idle roller unit includes an idle roller configured to maintain tension of the electrode sheet and to form a tangential line to the electrode sheet and two driving
(Continued)

mechanisms configured to change the position of the idle roller.

9 Claims, 3 Drawing Sheets

(58) Field of Classification Search
CPC .......................... B65H 2801/72; H01M 4/04; H01M 10/0404; Y02P 70/50
See application file for complete search history.

(56) References Cited

FOREIGN PATENT DOCUMENTS

| | | | | |
|---|---|---|---|---|
| CN | 111807110 | A * | 10/2020 | |
| CN | 114030934 | A * | 2/2022 | |
| DE | 3527178 | A1 * | 2/1987 | ............ B65H 18/26 |
| JP | H03184273 | A | 8/1991 | |
| JP | H0963565 | A | 3/1997 | |
| JP | 2014222595 | A | 11/2014 | |
| JP | 2019064827 | A | 4/2019 | |
| KR | 100953758 | B1 | 4/2010 | |
| KR | 101237254 | B1 | 2/2013 | |
| KR | 20150025381 | A | 3/2015 | |
| KR | 20150033260 | A | 4/2015 | |
| KR | 20150129488 | A | 11/2015 | |
| KR | 101885850 | B1 | 9/2018 | |
| KR | 101896580 | B1 | 9/2018 | |
| KR | 20190136227 | A | 12/2019 | |
| KR | 20200042131 | A | 4/2020 | |
| TW | 812556 | B1 * | 8/2023 | ........... B65H 18/028 |

OTHER PUBLICATIONS

Extended European Search Report including Written Opinion for Application No. 21872678.4 dated Nov. 22, 2024, pp. 1-8.

* cited by examiner

[FIG. 1]
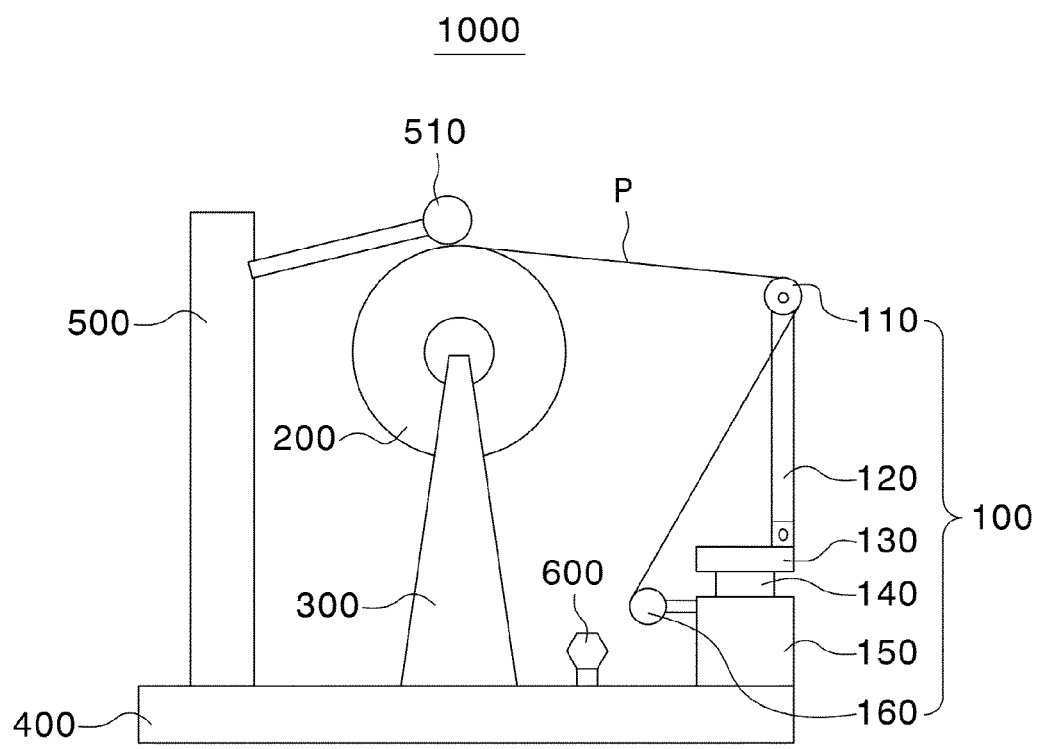

[FIG. 2]
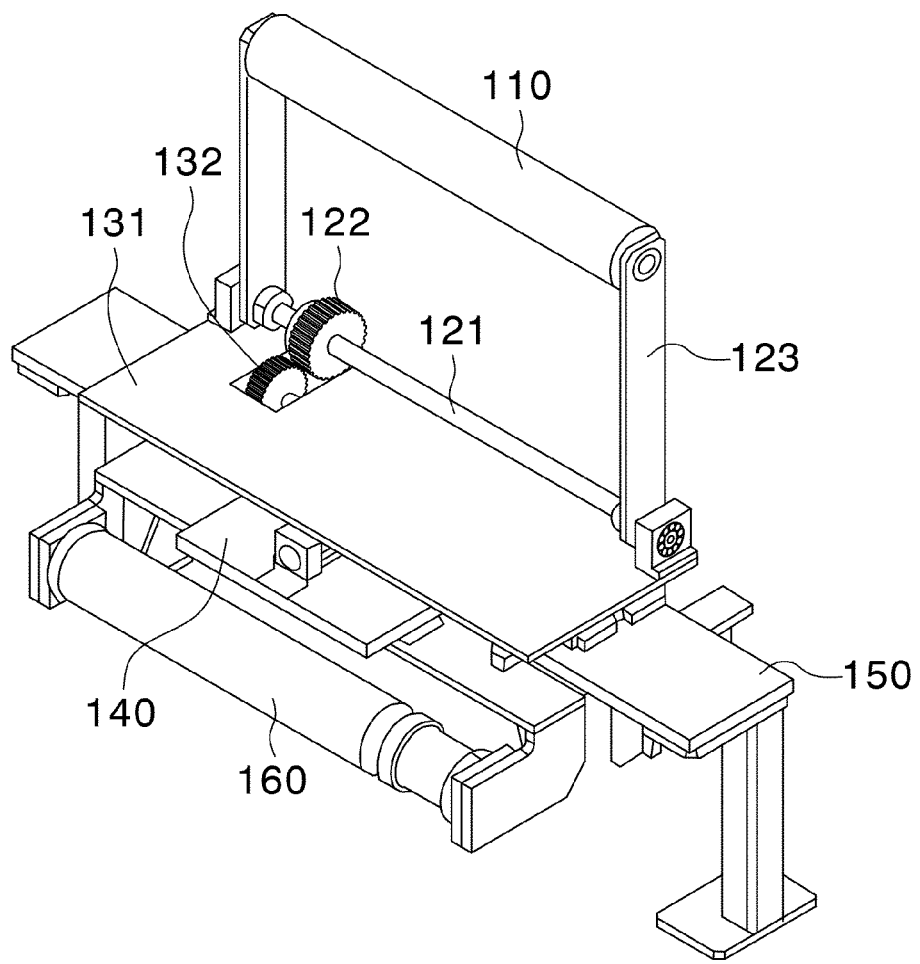

【FIG. 3】
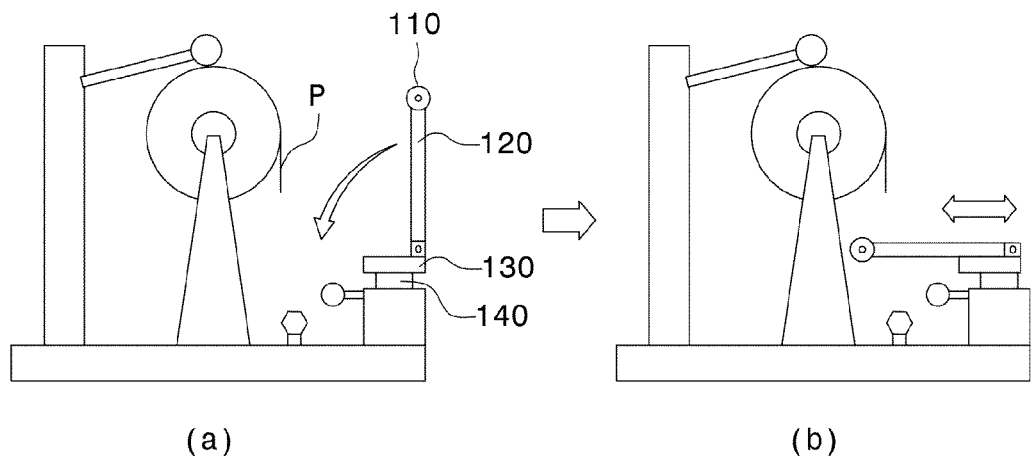
(a)　　　　　　　　(b)
【FIG. 4】
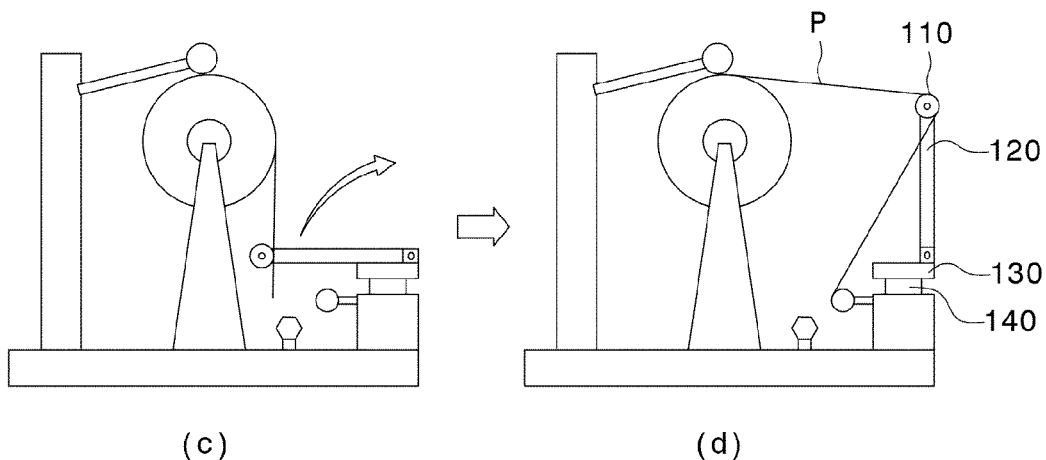
(c)　　　　　　　　(d)

ELECTRODE SHEET REWINDING APPARATUS INCLUDING POSITION-CHANGEABLE IDLE ROLLER

CROSS-REFERENCE TO RELATED APPLICATIONS

This application is a national phase entry under 35 U.S.C. § 371 of the International Application No. PCT/KR2021/008703 filed on Jul. 8, 2021, which claims the benefit of priority to Korean Patent Application No. 2020-00125808 filed on Sep. 28, 2020, the disclosures of which are incorporated herein by reference in their entireties.

The present invention relates to an electrode sheet rewinding apparatus including position-changeable idle roller capable of automatically connecting a PET film that is coupled to an electrode sheet to the electrode sheet rewinding apparatus before rewinding the electrode sheet in order to form a roll path.

BACKGROUND OF THE INVENTION

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium secondary battery, a nickel-cadmium battery, a nickel-hydride battery, and a nickel-zinc battery as secondary batteries that are widely used at present. In particular, research and development of the lithium secondary battery, which has high operating voltage and high energy density per unit weight, have been actively conducted.

Such a secondary battery includes an electrode assembly configured to have a structure in which electrodes and separators are alternately stacked and a case configured to receive the electrode assembly. The electrode assembly, which is a power generation element configured to have a structure in which a positive electrode and a negative electrode are stacked in the state in which a separator is interposed therebetween, is classified as a jelly-roll type electrode assembly, which is configured to have a structure in which a long sheet type positive electrode plate having an active material applied thereto and a long sheet type negative electrode plate having an active material applied thereto are wound in the state in which a separator is interposed therebetween, or a stacked type electrode assembly, which is configured to have a structure in which a plurality of positive electrode plates having a predetermined size and a plurality of negative electrode plates having a predetermined size are sequentially stacked in the state in which separators are interposed therebetween.

A stacked and folded type electrode assembly, which is configured to have a structure in which mono-cells each having a positive electrode/separator/negative electrode structure having a predetermined unit size or bicells each having a positive electrode (negative electrode)/separator/negative electrode (positive electrode)/separator/positive electrode (negative electrode) structure are folded using a long continuous separation film, has been developed as an electrode assembly having an advanced structure, which is a combination of the jelly-roll type electrode assembly and the stacked type electrode assembly.

In addition, a laminated and stacked type electrode assembly, which is configured to have a structure in which unit cells, in each of which electrodes and separators are laminated with each other in a state of being alternately stacked, are stacked, has also been developed in order to improve processability of a conventional stacked type electrode assembly and to satisfy demand for various kinds of secondary batteries.

The positive electrode used in the electrode assembly is manufactured by applying a mixture of a positive electrode active material, a conductive agent, and a binder to a positive electrode current collector, such as metal foil, and drying the mixture. A filler may be further added to the mixture as needed.

In addition, the negative electrode is manufactured by applying a negative electrode material to a negative electrode current collector and drying the negative electrode material. The components described in connection with the positive electrode may be optionally further included as needed.

After passing through a portion of the electrode manufacturing process, such as a notching process or a drying process, the electrode sheet is stored or transported in a state of being rewound around a bobbin.

The electrode sheet rewound around the bobbin is unwound so as to be used in a subsequent process. At this time, in order to solve a problem in that a portion of the innermost part of the electrode sheet cannot be used, a predetermined length of PET film is wound around the bobbin in the state in which the bobbin is empty before the electrode sheet is rewound therearound.

In the case in which the electrode sheet is not directly rewound around the empty bobbin but is rewound around the empty bobbin in a state of being connected to the PET film, it is possible to remedy a disadvantage in that a portion of the end part of the electrode sheet cannot be used when the electrode sheet wound around the bobbin is unwound.

In order to rewind the electrode sheet using the PET film, however, it is necessary to perform a process of unwinding the PET film from the bobbin before the electrode sheet is rewound to maintain a tangential line to the electrode sheet together with a touch roll located above the bobbin and supplying the PET film to an idle roller configured to enable rewinding of the electrode sheet to be easily performed, thereby forming a roll path.

Conventionally, such a PET film supply process is manually performed by a worker, whereby work efficiency is lowered and foreign matter is generated due to movement of the worker.

BRIEF SUMMARY OF THE INVENTION

The present invention has been made in view of the above problems, and it is an object of the present invention to provide an electrode sheet rewinding apparatus configured to have a structure in which the position of an idle roller is changeable by a first driving means and a second driving means such that a PET film that is coupled to an electrode sheet is automatically connected to the electrode sheet rewinding apparatus before rewinding the electrode sheet in order to form a roll path.

In order to accomplish the above object, an electrode sheet rewinding apparatus according to the present invention includes a bobbin having a PET film wound therearound, a bobbin holder configured to hold the bobbin, a base plate located under the bobbin holder, the base plate being configured to support the bobbin holder, a roller type touch roll configured to press an electrode sheet that is rewound around the bobbin above the bobbin in order to prevent meandering of the electrode sheet, a vertical plate located at one side of the base plate, the touch roll being attached to the vertical plate, and an idle roller unit configured to form a tangential line to the electrode sheet that is rewound around the bobbin together with the touch roll, wherein the idle roller unit includes an idle roller configured to maintain tension of the electrode sheet that is rewound and to form a tangential line to the electrode sheet and a first driving means and a second driving means configured to change the position of the idle roller.

Also, in the electrode sheet rewinding apparatus according to the present invention, the idle roller unit may further include a guide roller configured to maintain the tension of the electrode sheet together with the idle roller.

Also, in the electrode sheet rewinding apparatus according to the present invention, the idle roller unit may further include an upper frame, the first driving means being provided above the upper frame, the second driving means being provided under the upper frame.

Also, in the electrode sheet rewinding apparatus according to the present invention, the idle roller unit may further include a lower frame located under the second driving means, the lower frame being configured to fix the idle roller unit to the base plate.

Also, in the electrode sheet rewinding apparatus according to the present invention, the first driving means may include a driving shaft, a first gear connected to the driving shaft, and an idle roller support having one side rotatably connected to the driving shaft and the other side connected to the idle roller, whereby the first driving means may rotate the idle roller from a position perpendicular to a floor to a position parallel to the floor.

Also, in the electrode sheet rewinding apparatus according to the present invention, the upper frame may include a second gear engaged with the first gear, the second gear being configured to rotate the first gear.

Also, in the electrode sheet rewinding apparatus according to the present invention, the second driving means may be located between the upper frame and the lower frame to straightly move the idle roller in a direction parallel to the floor.

Also, the electrode sheet rewinding apparatus according to the present invention may further include a PET film sensor.

Also, in the electrode sheet rewinding apparatus according to the present invention, the PET film sensor may be attached to the base plate or the bobbin holder.

In addition, a battery cell according to the present invention is manufactured using the electrode sheet rewinding apparatus according to the present invention.

In addition, a battery module according to the present invention includes the battery cell according to the present invention.

An electrode sheet rewinding apparatus according to the present invention has an advantage in that the position of an idle roller is changeable through rotation and straight movement thereof, whereby it is possible to automatically form a PET film roll path.

In addition, the electrode sheet rewinding apparatus according to the present invention has an advantage in that the PET film roll path is automatically formed, whereby it is possible to prevent deterioration in work efficiency and generation of foreign matter due to movement of a worker.

BRIEF DESCRIPTION OF THE DRAWINGS

FIG. 1 is a front view schematically showing an electrode sheet rewinding apparatus according to an embodiment of the present invention.

FIG. 2 is a perspective view of an idle roller unit according to an embodiment of the present invention.

FIGS. 3 and 4 are schematic views showing a process of automatically connecting a PET film to the electrode sheet rewinding apparatus using the idle roller unit according to the embodiment of the present invention.

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an electrode sheet rewinding apparatus according to the present invention will be described with reference to the accompanying drawings.

FIG. 1 is a front view schematically showing an electrode sheet rewinding apparatus according to an embodiment of the present invention.

When describing the electrode sheet rewinding apparatus 1000 according to the present invention in detail with reference to FIG. 1, the electrode sheet rewinding apparatus 1000 includes an idle roller unit 100, a bobbin 200, a bobbin holder 300, a base plate 400, a vertical plate 500, a touch roll 510, and a PET film sensor 600.

First, a predetermined length of PET film P is wound around the bobbin 200 in the state in which the bobbin 200 is empty before an electrode sheet is rewound therearound.

As previously described, the PET film P is provided in order to use the entirety of the electrode sheet without waste upon unwinding the electrode sheet wound around the bobbin.

Next, the bobbin holder 300 is located on the base plate 400 to hold the bobbin 200.

In addition, the vertical plate 500, which is upright in a vertical direction in a state of being spaced apart from the bobbin holder 300 by a predetermined distance, is located on the base plate 400.

The touch roll 510 may be attached to one side of the vertical plate 500.

The touch roll 510, which is configured in the shape of a roller, presses the electrode sheet that is rewound around the bobbin 200 above the bobbin 200 in order to prevent meandering of the electrode sheet and to prevent introduction of air between electrode sheet layers.

Meanwhile, the PET film sensor 600 is coupled to the base plate 400 or the bobbin holder 300 to sense the position of the PET film P that is unwound from the bobbin 200, thereby providing data necessary to set a movement range of the idle roller unit 100.

A laser sensor, an ultrasonic sensor, or an optical sensor may be used as the PET film sensor 600. However, the present invention is not limited thereto, and any of various known sensors capable of detecting the PET film P may be used.

FIG. 2 is a perspective view of an idle roller unit according to an embodiment of the present invention.

When describing the position-changeable idle roller unit 100 according to the present invention in detail with reference to FIG. 2, the idle roller unit 100 includes an idle roller 110, a first driving means 120, an upper frame 130, a second driving means 140, a lower frame 150, and a guide roller 160.

First, the idle roller 110 contacts the PET film P or the electrode sheet together with the touch roll 510 to maintain tension of the PET film P or the electrode sheet and to form a tangential line to the PET film or the electrode sheet such that the electrode sheet can be easily rewound. The idle roller is a roller having a width greater than the width of the electrode sheet or the PET film P.

Next, the first driving means 120 includes a driving shaft 121, a first gear 122, and an idle roller support 123.

Here, the idle roller support 123 is connected to opposite ends of the driving shaft 121, which extends through the first gear 122. The driving shaft is rotated together with the first gear 122 when the first gear is rotated in order to rotate the idle roller support 123 connected thereto from a position perpendicular to the floor to a position parallel to the floor or from the position parallel to the floor to the position perpendicular to the floor.

In addition, one end of the idle roller support 123 is connected to the driving shaft, and the other end of the idle roller support is connected to the idle roller 110. Consequently, the idle roller 110 is also rotated with rotation of the idle roller support 123, whereby the position of the idle roller 110 is changed.

Meanwhile, the upper frame 130 includes an upper frame body 131 and a second gear 132.

The first driving means 120 is fastened to the upper frame body 131, and the second gear 132 is engaged with the first gear 122 of the first driving means 120 in order to drive the first gear 122.

The gear ratio of the first gear 122 to the second gear 132 and the rotational speed of the second gear may be appropriately adjusted to control the position change speed of the idle roller 110.

Next, the second driving means 140 is located under the upper frame 130.

The second driving means 140, which is configured to straightly move the upper frame 130 in a direction parallel to the floor, may be a combination of a linear motion (LM) guide and a motor. However, the present invention is not limited thereto, and any of various known devices capable of performing straight reciprocation may be used.

The upper frame 130 is straightly reciprocated by the second driving means 140, and therefore the first driving means 120 coupled to the upper frame 130 and the idle roller 110 coupled to the first driving means 120 may be straightly reciprocated.

Meanwhile, the lower frame 150 is coupled to the base plate 400, and second driving means 140 is provided on the lower frame. The lower frame serves to fix and support the idle roller unit 100.

In addition, the guide roller 160 may be coupled to one side of the lower frame 150.

The guide roller 160 is a roller that serves to maintain tension of the electrode sheet together with the idle roller 110.

FIGS. 3 and 4 are schematic views showing a process of automatically connecting the PET film to the electrode sheet rewinding apparatus using the idle roller unit according to the embodiment of the present invention.

When describing a process of automatically connecting the PET film P to the electrode sheet rewinding apparatus to form a roll path for rewinding of the electrode sheet with reference to FIGS. 3 and 4, first, the bobbin 200 having only the PET film P wound therearound is mounted to the electrode sheet rewinding apparatus 1000.

Subsequently, as shown in (a) of FIG. 3, the position of the PET film P is sensed by the PET film sensor 600, and the first driving means 120 is driven based on sensed data in order to rotate the idle roller 110 so as to be located under the PET film P.

Subsequently, as shown in (b) of FIG. 3, the idle roller 110 is straightly moved in the direction parallel to the floor using the second driving means 140 in order to accurately adjust the position of the idle roller.

Subsequently, as shown in (c) of FIG. 4, the PET film P is sufficiently unwound to a position lower than the idle roller 110, and then the idle roller 110 is returned to the original position thereof ((d) of FIG. 4), whereby a roll path of the PET film P for rewinding of the electrode sheet is formed.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

1000: Electrode sheet rewinding apparatus
100: Idle roller unit
110: Idle roller
120: First driving means
121: Driving shaft
122: First gear
123: Idle roller support
130: Upper frame
131: Upper frame body
132: Second gear
140: Second driving means

The invention claimed is:

1. An electrode sheet rewinding apparatus for rewinding an electrode sheet that has passed through a portion of a secondary battery electrode manufacturing process, the electrode sheet rewinding apparatus comprising:
    a bobbin having a PET film wound therearound;
    a bobbin holder configured to hold the bobbin;
    a base plate located under the bobbin holder, the base plate configured to support the bobbin holder;
    a roller type touch roll configured to press an electrode sheet rewound around the bobbin above the bobbin to prevent meandering of the electrode sheet;
    a vertical plate located at one side of the base plate, the touch roll attached to the vertical plate; and
    an idle roller unit configured to form a tangential line to the electrode sheet rewound around the bobbin together with the touch roll, wherein the idle roller unit comprises:
- an idle roller configured to maintain tension of the electrode sheet that is rewound and to form a tangential line to the electrode sheet; and
- a first driving means and a second driving means configured to change a position of the idle roller.

2. The electrode sheet rewinding apparatus according to claim 1, wherein the idle roller unit further comprises a guide roller configured to maintain the tension of the electrode sheet together with the idle roller.

3. The electrode sheet rewinding apparatus according to claim 2, wherein the idle roller unit further comprises an upper frame, the first driving means provided above the upper frame, the second driving means provided under the upper frame.

4. The electrode sheet rewinding apparatus according to claim 3, wherein the idle roller unit further comprises a lower frame located under the second driving means, the lower frame configured to fix the idle roller unit to the base plate.

5. The electrode sheet rewinding apparatus according to claim 4, wherein the first driving means comprises:
- a driving shaft;
- a first gear connected to the driving shaft; and
- an idle roller support having one side rotatably connected to the driving shaft and the other side connected to the idle roller, whereby
the first driving means is configured to rotate the idle roller from a position perpendicular to a floor to a position parallel to the floor.

6. The electrode sheet rewinding apparatus according to claim 5, wherein the upper frame comprises a second gear engaged with the first gear, the second gear configured to rotate the first gear.

7. The electrode sheet rewinding apparatus according to claim 4, wherein the second driving means is located between the upper frame and the lower frame to straightly move the idle roller in a direction parallel to a floor.

8. The electrode sheet rewinding apparatus according to claim 1, further comprising a PET film sensor.

9. The electrode sheet rewinding apparatus according to claim 8, wherein the PET film sensor is attached to the base plate or the bobbin holder.

* * * * *